United States Patent [19]

Chonan

[11] Patent Number: 5,096,215
[45] Date of Patent: Mar. 17, 1992

[54] FORK END OF A BICYCLE

[75] Inventor: Yoshiya Chonan, Toride, Japan

[73] Assignee: Sakae Ringyo Co., Ltd., Tokyo, Japan

[21] Appl. No.: 563,871

[22] Filed: Aug. 7, 1990

Related U.S. Application Data

[63] Continuation of Ser. No. 367,576, Jun. 19, 1989, abandoned.

[30] Foreign Application Priority Data

Dec. 13, 1988 [JP] Japan .................. 63-1611519[U]

[51] Int. Cl.$^5$ .............................. B62K 3/02
[52] U.S. Cl. ................... 280/284; 280/288; 280/281.1
[58] Field of Search ............ 280/288, 284, 285, 281.1, 280/279, 276, 274

[56] References Cited

U.S. PATENT DOCUMENTS

| | | | |
|---|---|---|---|
| 534,680 | 2/1895 | Bolte | 280/288 |
| 1,048,322 | 12/1912 | Kuehn | 280/285 |
| 4,565,383 | 1/1986 | Isaac | 280/288 X |
| 4,813,591 | 3/1989 | Mueller et al. | 280/288 X |
| 4,856,802 | 8/1989 | Schilplin | 280/288 |

Primary Examiner—Charles A. Marmor
Assistant Examiner—Alan M. Kagen
Attorney, Agent, or Firm—Lowe, Price, LeBlanc & Becker

[57] ABSTRACT

Fork ends attachable to opposite sides of a bicycle frame end each include at least an engagement groove to which an end of a rod member for supporting a wheel is engaged. Each fork end is detachably fastened by bolts to the frame of the bicycle within a recess provided therefor. Interposition elements of thicknesses selected to accommodate wheels of different width are provided between each fork and the frame end to which it is attached. In another aspect of this invention, there is provided a bicycle frame with such fork ends attached thereto.

12 Claims, 4 Drawing Sheets

Fig. 5(A)
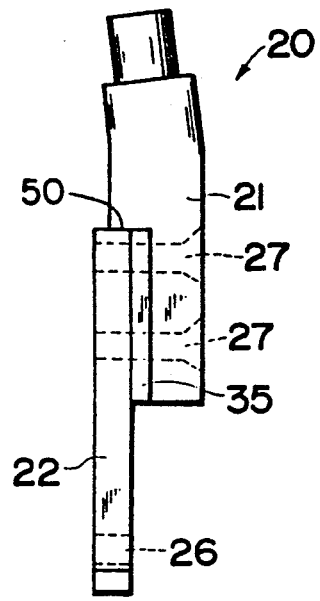
Fig. 5(B)
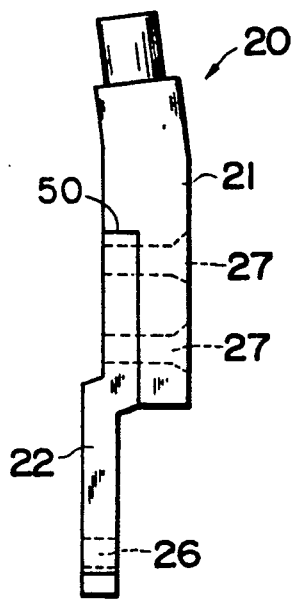
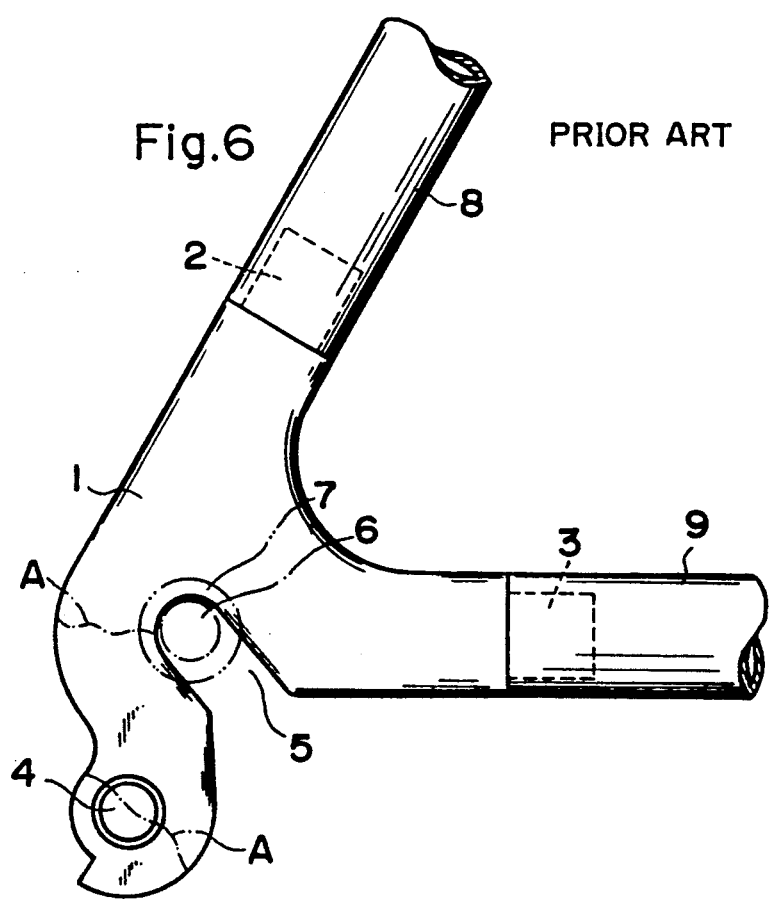
Fig. 6 PRIOR ART

FORK END OF A BICYCLE

This application is a file wrapper continuation of application Ser. No. 07/367,576 filed June 19, 1989, now abandoned.

FIELD OF THE INVENTION

The present invention relates to a fork end which is attached to each end of a back fork and a chain stay constituting a frame of a bicycle or an end of a front fork, and more particularly to a fork end including an engagement groove into which an end of a rod member is engaged.

BACKGROUND OF THE INVENTION

FIG. 6 is a front view showing a conventional fork end of a bicycle. In FIG. 6, numeral 1 denotes a fork end including cylindrical lugs 2 and 3 formed integrally in bifurcated ends thereof. These lugs 2 and 3 are fitted into each end of a back fork 8 and a chain stay 9, respectively, and fixed thereto by adhesives or soldering. The fork end 1 is formed at the tip thereof with a hole 4 for engaging a screw and through which a rear gearbox (not shown) is attached. Further, the fork end 1 is formed at the substantially center portion thereof with an engagement groove 5 having a downwardly inclining opening. A rod member 6 is engaged into the engagement groove 5 so that an end of the rod member 6 is projected sideways from the groove 5, and a hub shaft 7 is fitted onto the rod member 6. A hub (not shown) is rotatably mounted to the hub shaft 7 and a wheel, e.g., a rear wheel (not shown) is mounted to the hub through spokes. The rod member 6 engaged into the engagement groove 5 is moved axially by an operation of a quick lever (not shown) or nuts are engaged to the rod member 6 to hold the hub shaft 7 by the fork ends 1 between the nuts, so that the wheel is detachably mounted to the bicycle frame.

Where the engagement groove 5 is provided in the fork end 1, the mechanical strength in the proximity thereof is weakened. Similarly, the provision of the hole 4 also weakens the mechanical strength of the fork end tip. Accordingly, when an excessive force is experienced close to the engagement groove 5 through the wheel due to up and down movement of the bicycle in the running of the bicycle, or when an excessive force is exerted to the hole 4 through the rear gearbox due to falling-down of the bicycle, the portions of the fork end near the engagement groove 5 or the hole 4 may be deformed or broken (as shown by phantom lines A of FIG. 6).

As described above, the conventional fork end has the integral structure and includes the lugs 2 and 3 which are fixed to the back fork 8 and the chain stay 9 by adhesives or the like, respectively. Accordingly, when the proximity of the engagement groove 5 is deformed or broken, the conventional fork end 1 cannot be removed from the back fork 8 or the like and, hence, it is necessary to replace the whole frame of the bicycle and this is very expensive.

It has been considered that the thickness of the fork end 1 be made larger to enhance its mechanical strength, although the weight of the bicycle is then increased.

SUMMARY OF THE INVENTION

The present invention solves the above problems, and a principal object of the present invention is to provide a fork end of a bicycle which can be replaced easily when it has been deformed or broken.

Accordingly, the fork end of the present invention comprises a coupling portion attached to a frame of a bicycle and a fork end body including at least an engagement groove and which is detachably fastened to the coupling portion by bolts.

Since the coupling portion and the fork end body are formed separately, even when the fork end body or the proximity of the engagement groove of the fork end body is deformed or broken, only the fork end body need be replaced with a new fork end body, i.e., the deformed or broken fork end body can be removed easily and a new fork end body can be mounted to the coupling portion by bolts. Accordingly, since it is not necessary to replace the entire frame of the bicycle, the bicycle can be repaired inexpensively and efficiently.

BRIEF DESCRIPTION OF THE DRAWINGS

FIGS. 5(A) and (B) are side views of modifications of a fork end according to the present invention; and FIG. 6 is a front view of a conventional fork end.

DESCRIPTION OF THE PREFERRED EMBODIMENTS

An embodiment of the present invention will now be described in detail with reference to drawings.

Figure 3:
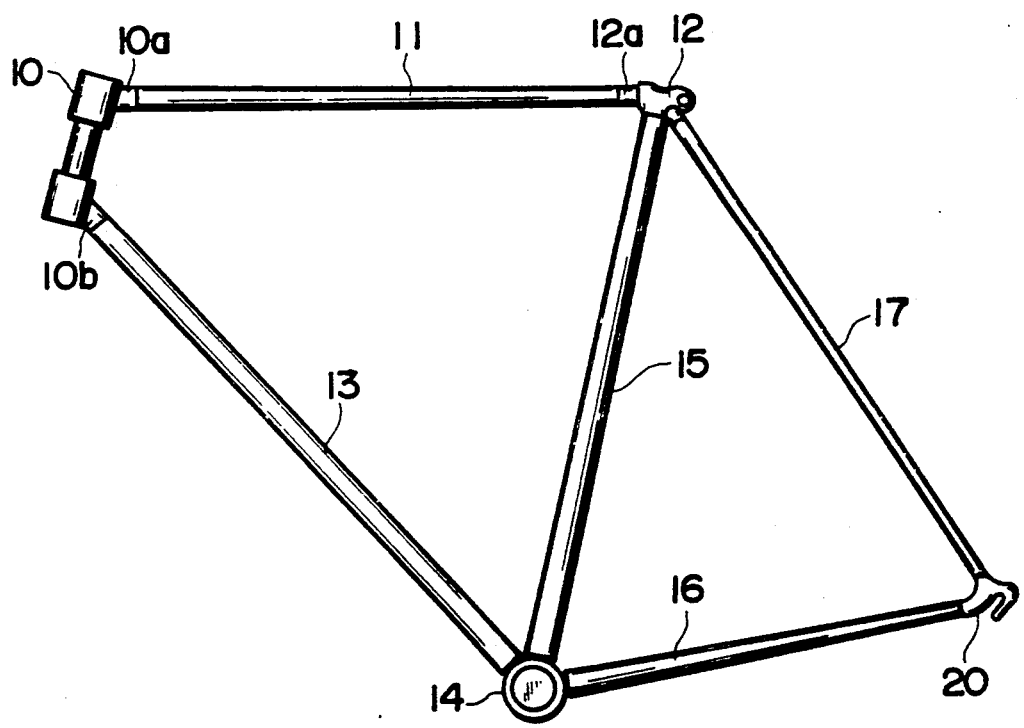
FIG. 3 shows a structure of a frame of a bicycle.

FIG. 3 shows the whole structure of a frame of a bicycle, in which numeral 10 denotes a head tube made of aluminum. The head tube 10 is formed at upper and lower ends thereof with lugs 10a and 10b. The lug 10a is fitted into one end of a top tube 11 and the other end of the top tube 11 is fitted onto a lug 12a of a seat bracket 12. The other lug 10b of the head tube 10 is fitted into one end of a down tube 13 and the other end of the down tube 13 is fitted into a lug of a hanger lug or bottom bracket 14. A lower end of a seat tube 15 is fitted into another end of the bottom bracket 14 and an upper end of the seat tube 15 is fitted into the other lug of the seat bracket 12. One end of a chain stay 16 is fitted into a further lug of the bottom bracket 14. An upper end of a back fork 17 is fixedly mounted to the seat bracket 12. A fork end 20 of the present invention is mounted to the other ends of the chain stay 16 and the back fork 17.

Figure 1:
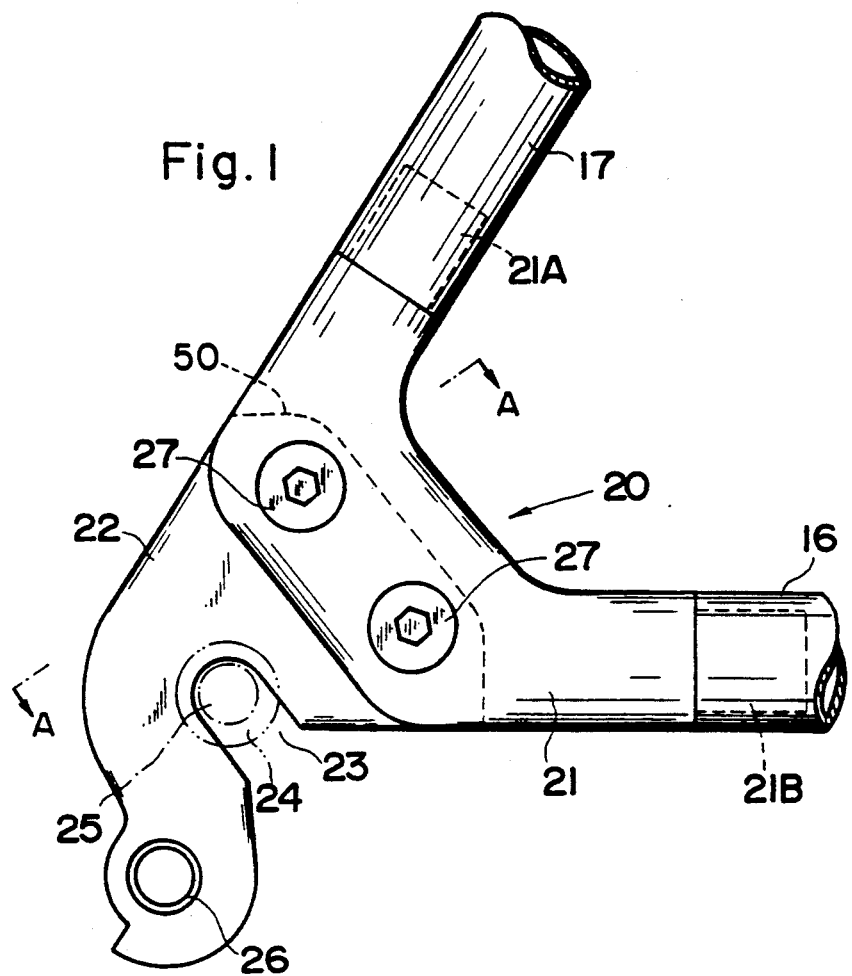
FIG. 1 is a front view of a fork end according to the present invention.
Figure 2:
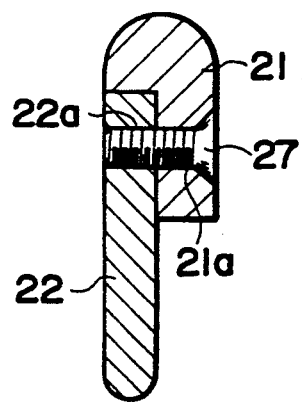
FIG. 2 is a sectional view taken along a line A—A of FIG. 1.

FIG. 1 is a front view of the fork end 20 of the present invention, and FIG. 2 is a sectional view taken along a line A—A of FIG. 1. The fork end 20 comprises a coupling portion 21 and a fork end body 22. The coupling portion 21 is formed into a substantially U-letter shape and is integrally formed at both ends with cylindrical lugs 21A and 21B. One lug 21A is fitted into the other end of the back fork 17 by adhesives and the other lug 21B is fitted into the other end of the chain stay 16 by adhesives. Each of the lugs 21A and 21B is formed to have a recess 50, best seen in FIGS. 1, 4, and 5A and 5B, to receive the fork end bodies. The fork end body 22 is formed with an engagement groove 23 which is opened downward obliquely. A rod member 25 is engaged in the engagement groove 23 so that ends of the rod member 25 are projected outwardly from the groove, and a hub shaft 24 is fitted onto the rod member 25. Further, the fork end body 22 is formed at the tip thereof with a hole 26 for engaging a screw and a rear gearbox is mounted through the hole 26.

A pair of through holes 21a are formed in the coupling portion 21 and a pair of threaded holes 22a are formed in the fork end body 22. An upper portion of the fork end body 22 is engaged in a step of the coupling portion 21 and bolts 27 are screwed into the threaded holes 22a through the holes 21a so that the fork end body 22 is detachably mounted to the coupling portion 21.

Figure 4:
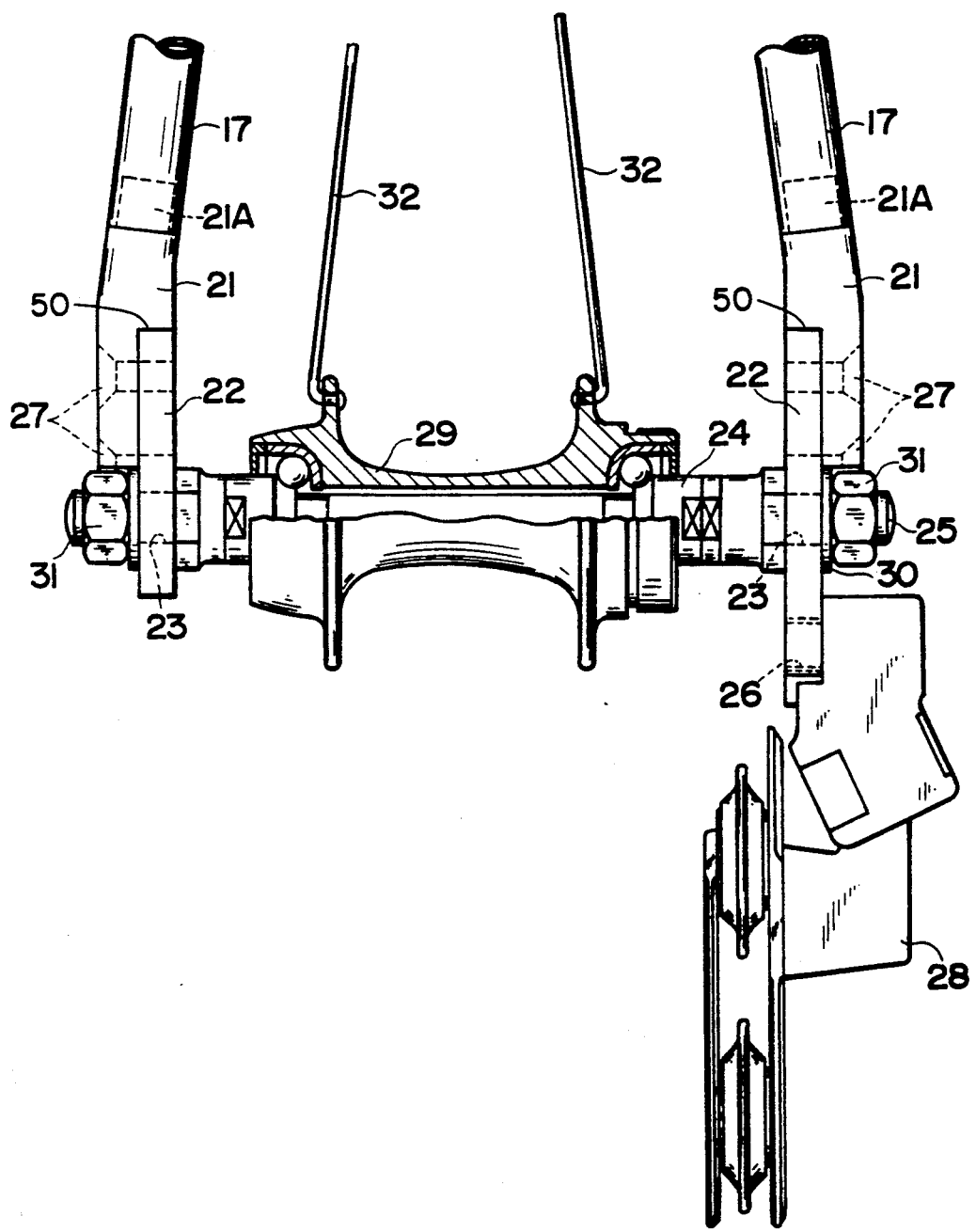
FIG. 4 is a sectional view of the fork end according to the present invention as assembled.

FIG. 4 is a sectional view of the fork end 20 of the present invention which is assembled. In FIG. 4, the fork end body 22 of one fork end 20 is formed with the hole 26 (refer to FIG. 1) in order to mount a rear gearbox 28 thereto, while the fork end body 22 of the other fork end 20 is provided with only the engagement groove 23. The rod member 25 is engaged in the engagement grooves 23 of both the fork end bodies 22 so that both ends of the rod member 25 are projected from the engagement grooves 23 and a hub shaft 24 is fitted onto the rod member 25, as described above. The hub 29 is rotatably mounted to the hub shaft 24 and a plurality of gearboxes not shown are mounted to one end of the hub 29. Nut members 31 are engaged to both ends of the rod member 25 projected from the fork end body 22 through washers 30. Accordingly, since both the fork ends 20 (hence both fork end bodies 22) are forcibly held by the nut members 31, and the hub shaft 24 is held by both the fork ends 20. Thus, a rear wheel (not shown) supported by the hub 29 through spokes 32 can be mounted to the frame of the bicycle.

In the fork end 20 as structured above, when an excessive force is exerted to the proximity of the engagement groove 23 through the rear wheel in the running of the bicycle, or when an excessive force is exerted to the hole 26 through the rear gearbox 28 due to falling-down of the bicycle, the proximity of the engagement groove 23 or the hole 26 is deformed or broken. On the contrary, the fork end 20 of the present invention includes the fork end body 22 in which the engagement groove 23 and the hole 26 are formed. Accordingly, in the fork end 20 of the present invention, when the proximity of the engagement groove 23 or the hole 26 is deformed or broken, the fork end body 22 can be removed from the coupling portion 21 by loosening the bolts 27 and a new fork end body can be easily attached to the coupling portion 21 by the bolts 27. Consequently, it is not necessary to exchange the entire frame of the bicycle.

FIGS. 5(A) and (B) show modifications of fork having a of the present invention, respectively. The fork end 20 selected thickness, as shown in FIG. 5(A), includes an interposition member 35 having a selectable predetermined thickness through which the fork end body 22 is fixedly mounted to the coupling portion 21 by bolts 27. Accordingly, the distance between both the fork ends 20 (fork end bodies 22) can be set by the selected thickness of the interposition member 35 to correspond the length of the hub shaft 24 (hub 2a).

The fork end 20 shown in FIG. 5(B) includes a fork end body 22 of which a portion is bent inward and extends downward. Accordingly, the distance between the fork ends 20 (fork end bodies 22) can be set to the length of the hub shaft.

It should be a matter of course for persons skilled in the art that the fork end of the present invention may be mounted in obvious manner to a front fork to exchange the fork end body.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

I claim:

1. An improved fork end assembly, mounted to a forked frame end of a bicycle to provide opposite sides of a wheel-receiving fork of a selected width thereat, said opposite sides each ending in a bracket having a recess of a predetermined depth at an inside end portion, said assembly comprising:
   first and second detachable fork end bodies each of a predetermined first thickness at a frame attachment end; and
   first and second interposition bodies, each of a predetermined second thickness, said first and second fork end bodies each comprising a coupling portion formed to be mounted to a corresponding one of said opposite sides of said fork in said recess thereof with a respective one of said first and second interposition bodies interposed in between within the recess, said first and second fork end bodies each having an end portion including at least an engagement groove for receiving a wheel axle, selection of said second predetermined thickness enabling setting of a distance therebetween during use to correspond to a length of a hub shaft in a wheel of the bicycle.

2. A fork end according to claim 1, further comprising:
   means for detachably attaching said first and second fork end bodies to respective sides of said fork with said first and second interposition bodies correspondingly interposed therebetween, said attachment means comprising elements passing through apertures formed in said first and second fork bodies, said interposition bodies and said recesses in said sides of said bicycle frame end.

3. A fork end according to claim 1, wherein:
   said predetermined depth of each said recess is greater than a sum of said first thickness of a corresponding fork end body and said second thickness of a corresponding interposition body mounted thereto, whereby coaction between said recess and said corresponding end body prevents relative rotation therebetween.

4. A fork end according to claim 2, wherein:
   said predetermined depth of each said recess is greater than a sum of said first thickness of a corresponding fork end body and said second thickness of a corresponding interposition body mounted thereto, whereby coaction between said recess and said corresponding end body prevents relative rotation therebetween.

5. A fork end according to claim 2, wherein:
   said elements threadedly engage with said sides of said fork end.

6. A fork end according to claim 4, wherein:

said elements threadedly engage with said sides of said fork end.

7. A bicycle frame, comprising:

a forked frame end to provide opposite sides of a wheel-receiving fork of a selected width thereat, said opposite sides each ending in a bracket having a recess of a predetermined depth at an inside end portion;

a first detachable fork end body of a predetermined first thickness at a frame attachment end;

a second detachable fork end body of a predetermined first thickness at a frame attachment end; and first and second interposition bodies, each of a predetermined second thickness, said first and second fork end bodies each comprising a coupling portion formed to be mounted to a corresponding one of said brackets on opposite sides of said fork, in said recess thereof, with a respective one of said first and second interposition bodies interposed between the corresponding fork body and bracket within the recess to determine a distance available to correspond to a length of a hub of a bicycle wheel mounted therebetween, said first and second fork end bodies each having an end portion including at least an engagement groove for receiving a wheel axle.

8. A bicycle frame according to claim 7, further comprising:

means for detachably attaching said first and second fork end bodies to respective sides of said fork with said first and second interposition bodies correspondingly interposed therebetween, said attachment means comprising elements passing through apertures formed in said first and second fork bodies, said interposition bodies and said recesses in said sides of said bicycle frame end.

9. A bicycle frame according to claim 7, wherein:

said predetermined depth of each said recess is greater than a sum of said first thickness of a corresponding fork end body and said second thickness of a corresponding interposition body mounted thereto, whereby coaction between said recess and said corresponding end body prevents relative rotation therebetween.

10. A bicycle frame according to claim 8, wherein:

said predetermined depth of each said recess is greater than a sum of said first thickness of a corresponding fork end body and said second thickness of a corresponding interposition body mounted thereto, whereby coaction between said recess and said corresponding end body prevents relative rotation therebetween.

11. A bicycle frame according to claim 8, wherein:

said elements threadedly engage with said sides of said fork end.

12. A bicycle frame according to claim 10, wherein:

said elements threadedly engage with said sides of said fork end.

* * * * *